United States Patent
Long et al.

(10) Patent No.: US 10,207,580 B2
(45) Date of Patent: Feb. 19, 2019

(54) WORK VEHICLE DRIVE WITH COMPACT MULTI-SPEED SHIFT ASSEMBLY

(71) Applicant: Deere & Company, Moline, IL (US)

(72) Inventors: Randall L. Long, Coffeyville, KS (US); Cecil H. Wise, Jr., Coffeyville, KS (US); G. William Detrick, Coffeyville, KS (US)

(73) Assignee: Deere & Company, Moline, IL (US)

( * ) Notice: Subject to any disclaimer, the term of this patent is extended or adjusted under 35 U.S.C. 154(b) by 17 days.

(21) Appl. No.: 15/373,615

(22) Filed: Dec. 9, 2016

(65) Prior Publication Data
US 2018/0162221 A1 Jun. 14, 2018

(51) Int. Cl.
*B60K 17/04* (2006.01)
*F16H 3/66* (2006.01)
*B60K 17/08* (2006.01)

(52) U.S. Cl.
CPC ........ *B60K 17/046* (2013.01); *F16H 3/666* (2013.01); *B60K 17/08* (2013.01); *B60Y 2200/411* (2013.01); *F16H 2200/0034* (2013.01); *F16H 2200/2005* (2013.01); *F16H 2200/2035* (2013.01)

(58) Field of Classification Search
CPC ....... B60K 17/046; B60K 17/08; F16H 3/666; F16H 2200/0034; F16H 2200/2005; F16H 2200/2035
See application file for complete search history.

(56) References Cited

U.S. PATENT DOCUMENTS

| 1,792,485 A | 2/1931 | Fawick |
| 2,543,811 A | 3/1951 | Snow et al. |
| 3,115,204 A * | 12/1963 | Dence ............... B60K 17/046 180/10 |
| 3,324,965 A | 6/1967 | Koch et al. |

(Continued)

FOREIGN PATENT DOCUMENTS

| JP | 2013082320 A | 5/2013 |
| WO | 2014210128 A1 | 12/2014 |

OTHER PUBLICATIONS

Deere & Company, pending U.S. Appl. No. 15/009,130, "Compact Multi-Speed Planetary Drive Assembly", filed Jan. 28, 2016.
(Continued)

*Primary Examiner* — David J Hlavka
(74) *Attorney, Agent, or Firm* — Klintworth & Rozenblatt IP LLP (57) ABSTRACT

A drive assembly includes a drive housing, a bearing-mounted wheel mount configured to rotate about a rotation axis with respect to the drive housing, and a shift assembly coupled between an input shaft and the wheel mount to selectably cause rotation of the wheel mount various rotational speeds. The shift assembly includes a gear set and a brake arrangement. The gear set has a first gear and a second gear, each being rotatable by the input shaft independent of the other. The brake arrangement has a first brake component and a second brake component. During rotation of the wheel mount at a first rotational speed, the first brake component brakes the first gear with respect to the drive housing. During rotation of the wheel mount at a second rotational speed, the second brake component brakes the second gear with respect to the drive housing.

18 Claims, 6 Drawing Sheets

(56) References Cited

U.S. PATENT DOCUMENTS

| | | | |
|---|---|---|---|
| 3,434,364 A | | 3/1969 | Keese |
| 4,020,716 A | | 5/1977 | Toth et al. |
| 4,540,073 A | * | 9/1985 | Rogier ................. B60K 17/046 188/71.5 |
| 4,562,903 A | * | 1/1986 | Rogier ................. B60K 17/046 188/18 A |
| 6,692,401 B2 | | 2/2004 | Hofschulte et al. |
| 2003/0203782 A1 | * | 10/2003 | Casey ..................... B60K 1/00 475/150 |
| 2009/0078528 A1 | * | 3/2009 | Uzawa ................. B60K 7/0007 192/12 D |
| 2016/0263987 A1 | * | 9/2016 | Brownell ............. B60K 17/046 |

OTHER PUBLICATIONS

Deere & Company, pending U.S. Appl. No. 15/140,090, "Work Vehicle Drive Assembly", filed Apr. 27, 2016.
Oerlikon Fairfield, Fairfield Torque-Hub Compact Track Loader Drives, Fairfield Manufacturing Co., Inc., Version 1, Feb. 2012.
Oerlikon Fairfield, Fairfield Torque-Hub Planetary Final Drives, Fairfield Manufacturing Co., Inc., Version 4—English, Apr. 2016.

* cited by examiner

WORK VEHICLE DRIVE WITH COMPACT MULTI-SPEED SHIFT ASSEMBLY

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to drive arrangements, and in particular to drives for work vehicles.

BACKGROUND OF THE DISCLOSURE

In various work vehicle applications, a drive assembly may be utilized to provide rotational power to various components of the vehicle. In some wheeled or tracked vehicles, such as motor graders, a final drive assembly is mounted to a frame of the vehicle to provide rotational power, at a wheel mount of the drive assembly, to drive the wheels or tracks of the vehicle, and thereby move the vehicle over terrain. Such a drive assembly (and others) may include hydraulic motors for providing rotational power, and various gears for adjusting the speed of the rotational power for output at the wheel mount.

In some cases, the motors may be operated at one or more different speeds. While the use of multiple speeds in a drive assembly can significantly reduce the cost of the related motors, inverters, and electrical devices, the higher operating speeds of an electric motor significantly increases the ratios required from the drive assembly and can simultaneously result in an increase in size and cost of the overall drive assembly. Arranging and packaging complex assemblies such as these, along with gear trains, shifting assemblies, bearings, shafts and other drive components, in what may be a relatively tight space envelop, particularly in the axial direction, can be a challenge.

SUMMARY OF THE DISCLOSURE

The disclosure provides a drive with a multi-speed shifting assembly having a compact form factor.

One aspect the disclosure provides a drive assembly receiving rotational power from an input shaft rotatable about a rotation axis. The drive assembly includes a drive housing, a bearing-mounted wheel mount configured to rotate about the rotation axis with respect to the drive housing, and a shift assembly coupled between the input shaft and the wheel mount to selectably cause rotation of the wheel mount at one of at least two different rotational speeds. The shift assembly includes a gear set and a brake arrangement. The gear set has a first gear and a second gear, each of the first and second gears being rotatable by the input shaft independent of the other gear. The brake arrangement has a first brake component and a second brake component. During rotation of the wheel mount at a first rotational speed, the first brake component brakes the first gear of the gear set with respect to the drive housing. During rotation of the wheel mount at a second rotational speed, the second brake component brakes the second gear of the gear set with respect to the drive housing.

Another aspect the disclosure provides a shift assembly for a drive assembly, receives rotational power from an input shaft rotatable about a rotation axis and includes a wheel mount configured to rotate about the rotational axis with respect to a housing of the drive assembly. The shift assembly includes a gear set and a brake arrangement. The gear set has a first gear and a second gear, each of the first and second gears being rotatable by the input shaft independent of the other gear. The brake arrangement has a first brake component and a second brake component. During rotation of the wheel mount at a first rotational speed, the first brake component brakes the first gear of the gear set with respect to the drive housing. During rotation of the wheel mount at a second rotational speed, the second brake component brakes the second gear of the gear set with respect to the drive housing.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed multi-speed drive arrangement, as shown in the accompanying figures of the drawings described briefly above. Various modifications to the example embodiments may be contemplated by one of skill in the art.

As mentioned above, known designs for multi-speed drive assemblies may be unsatisfactory in a number of respects. For example, such drives may exhibit significant complexity, leading to high manufacturing costs and a significant increase in size and weight. This is particularly the case in off-highway and other such work vehicles, such as motor graders, self-propelled sprayers and the like, in which it is desirable for the drive to provide multiple speeds, while at the same time reducing the space envelope required for the drive. In the case of certain in-line drive arrangements, such as final drives, a key envelope dimension is the axial dimension about which certain drive components rotate to drive the wheels or other vehicle components.

In this regard, the term "axial" as used herein refers to a direction that is generally parallel to an axis of rotation, axis of symmetry, or centerline of a component or components. For example, in a cylinder with a centerline and opposite, circular ends, the "axial" direction may refer to the direction that generally extends in parallel to the centerline between the opposite ends. In certain instances, the term "axial" may be utilized with respect to components that are not cylindrical (or otherwise radially symmetric). For example, the "axial" direction for a rectangular housing containing a rotating shaft may be viewed as a direction that is generally in parallel with the rotational axis of the shaft. Furthermore, the term "radially" as used herein may refer to a direction or a relationship of components with respect to a line extending perpendicularly outward from a shared center line, axis, or similar reference. For example, two concentric and axially overlapping cylindrical components may be viewed as "radially" aligned over the portions of the components that axially overlap, but not "radially" aligned over the portions of the components that do not axially overlap. In certain instances, components may be viewed as "radially" aligned even though one or both of the components may not be cylindrical (or otherwise radially symmetric).

Certain known drive assemblies may include a motor mounted at an end of a gear housing of the drive assembly. The gear housing may be integrally formed with a hub, which may be attached to an external device, such as a wheel or sprocket, in order to provide rotational power from the motor to the external device. One or more planetary (or "epicyclical") gear sets in communication with the motor may be disposed within the gear housing in order to provide a speed reduction of various ratios with respect to the rotational power from the motor. The drive may incorporate various complex assemblies to provide multiple speeds and the desired high gear reduction and torque that may make the routing of hydraulic fluid for power and or cooling difficult. Moreover, the motor and gearing components required of such drives may make the axial dimension larger than desired for certain work applications.

The embodiments of the disclosed drive may address various of the issues noted above, as well as provide various additional benefits. Generally, in place of the relatively large shifting assemblies of prior art drives, the shifting assembly, or at least the planetary gear set and brake components thereof, are positioned such that it substantially fits within (or "under") the wheel bearing support of the drive assembly—i.e., the shifting assembly substantially fits within the axial borders of the wheel bearing support and within inner radial dimension of the wheel bearing support. In this way, the shifting assembly (including, for example, one or more brake and planetary components) may be more compactly disposed, resulting in a reduced axial dimension.

In certain embodiments the axially compact nature of the shifting assembly may, in part, be facilitated by a compact brake arrangement disposed about the circumference of a planetary gear set that, in coordination with the brake arrangement, effects different modes of operation of the drive. The use of brake components simplifies the assembly, and delivery of energizing power thereto, by reducing the number of rotating components (e.g., when compared to a clutched arrangement) around or through which hydraulic fluid may need to pass.

As one example, the shifting assembly may include a pair of brake components each having its own set of friction disks or separator plates that interleave with an associated set of separator plates or friction disks that are coupled to the drive housing so that, when the associated set of interleaved friction disks and separator plates is engaged, that brake component impedes or arrests movement of one or more components of the planetary set, which in turn effects a different gear ratio to be output by the shifting assembly. Each brake component may include an actuation mechanism including a hydraulic piston plate and a spring, for example, configured in a spring applied, hydraulically released manner. This piston and spring arrangement may be compactly disposed radially outward of the planetary set within a center opening of a wheel bearing support and between the axial ends of the wheel bearing support. This not only reduces the axial space occupied by the shifting assembly, but the use of larger springs also provides for greater axial force to be applied to the brake components over a shorter axial distance. The more robust springs further work to improve the life of the shifting assembly since less deflection for each actuation of the brake component is required.

In other embodiments, the shifting assembly may be in the form of a single compound planetary set. For example, the single planetary set may be a 2-speed sun gear input, carrier output configuration. The single planetary arrangement may also be configured to provide neutral and park modes. The neutral mode prevents the wheels from back-driving and over-running the motor, and the park mode locks the vehicle wheels against rotation.

In still other embodiments, the compound planetary set may include multiple ring gears at the outer periphery of the gear set. Each ring gear is mounted for relative rotation with respect to each other and the drive housing and each may mount the set of friction disks or separator plates associated with one of the brake components. Engagement of the associated set of friction disks or separator plates will impede or arrest rotation of the associated ring gear, in turn changing the gear ratio of the planetary and the output of the shifting assembly. In an arrangement with two brake components and two ring gears, for example, the shifting assembly, and thus the drive itself, may effect two drive speeds as well as one or both of freewheeling and parked modes. As one example, when a first ring gear is braked by a first brake component, the shifting assembly may put the drive in a relatively high speed, low torque mode. When a second ring gear is braked by a second brake component, and the first ring gear is unbraked, the shifting assembly may put the drive in a relatively low speed, high torque mode. The shifting assembly be further configured such that braking both the first and second ring gears puts the drive in a park mode in which the output hub (and thereby the wheels/tracks) are mechanically locked against rotation by the drive. The shifting assembly may also be configured such that unbraking both ring gears puts the drive in a neutral mode in which the output hub may freewheel.

Referring now to the drawings, the disclosed drive assembly may be utilized in the context of a wide range of work vehicles, including, as mentioned, a motor grader. In this regard, while a motor grader is illustrated and described herein as an example work vehicle, one skilled in the art will recognize that principles of the multi-speed drive arrangement disclosed herein may be readily adapted for use in other types of work vehicles, including, for example, various crawler dozer, loader, backhoe and skid steer machines used in the construction industry, as well as various other machines used in the agriculture and forestry industries, such as tractors, sprayers, skidders and the like. As such, the present disclosure should not be limited to applications associated with motor graders or the particular example motor grader shown and described.

Figure 1:
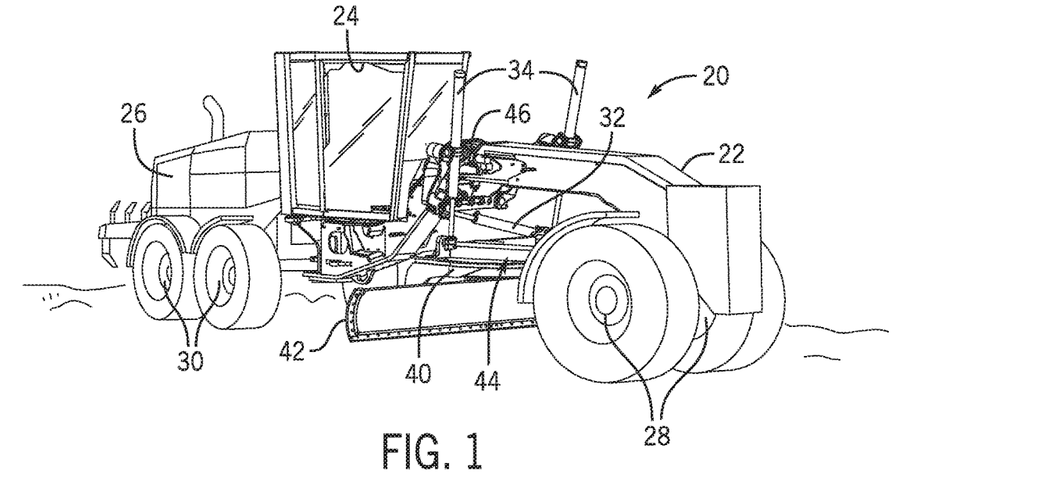
FIG. 1 is perspective view of a work vehicle in the form of a motor grader in which the drive assembly of this disclosure may be incorporated.

As shown in FIG. 1, a motor grader 20 may include a main frame 22 supporting an operator cabin 24 and a power plant 26 (e.g., a diesel engine) operably coupled to power a drive train. The main frame 22 is supported off of the ground by ground-engaging steered wheels 28 at the front of the machine and by two pairs of tandem drive wheels 30 at the rear of the machine. The power plant may power one or more hydraulic pumps (not shown), which pressurize hydraulic fluid in a hydraulic circuit including various electro-hydraulic valves, hydraulic drives and hydraulic actuators, including a circle shift actuator 32, lift actuators 34, a blade shift actuator (not shown) and a circle rotate drive (not shown). In the illustrated example, the main frame 22 has an articulation joint (not shown) between the operator cabin 24 and power plant 26 that allows the front section of the main frame 22 to deviate from the centerline of the rear section of the main frame 22, such as during a turning operation to shorten the effective wheelbase of the motor grader 20, and thus, shorten the turning radius of the machine. A circle 40 and blade 42 assembly is mounted to the main frame 22 in front of the operator cabin 24 by a drawbar 44 and a lifter bracket 46, which in certain embodiments may be pivotal with respect to the main frame 22. Cylinders of the lift actuators 34 may be mounted to the lifter bracket 46, and pistons of the lift actuators 34 may be connected to the circle 40 so that relative movement of the pistons may raise, lower and tilt the circle 40, and thereby the blade 42. The circle 40, via the circle drive and various actuators, causes the blade 42 to be rotated relative to a vertical axis as well as shifted sideways or laterally in relation to the main frame 22 and/or the circle 40. The drive wheels 30 of the motor grader 20 are driven by a drive assembly (not shown in FIG. 1) configured as a final drive assembly that is mounted to the frame 22 of the motor grader 20 in order to provide motive power to the drive wheels 30. It will be understood that the disclosed drive assembly may be utilized as a final drive assembly, as illustrated for providing motive power to a ground-engaging element of the vehicle (e.g., wheels, tracks, or the like), or may be utilized to provide rotational power to other types of devices.

As mentioned briefly above, drive assemblies in accordance with various embodiments are configured such that their shifting assemblies, or at least the planetary sets and brake components thereof, are located substantially "beneath" or "within" their wheel bearing assemblies (i.e., the wheel bearing supports and/or the wheel bearings themselves) in order to minimize the overall axial dimension of the drive assembly. Generally, the wheel bearing assemblies may have any suitable shape and structure and include one, two, or more wheel bearings configured in a variety of arrangements, as described in further detail below. Likewise, the wheel bearing supports may have any suitable shape and structure configured to provide structural support (e.g., axial, tangential, and/or radial support) to the wheel bearing assemblies. The shifting assemblies may include a variety of components, such as disk packs, actuators, and gears (e.g., a planetary gear arrangement described below) that together allow the drive assemblies to implement a variety of modes, such as "high", "low", "neutral" and "park" modes (referred to respectively as simply H, L, N and P modes herein).

Figure 2:
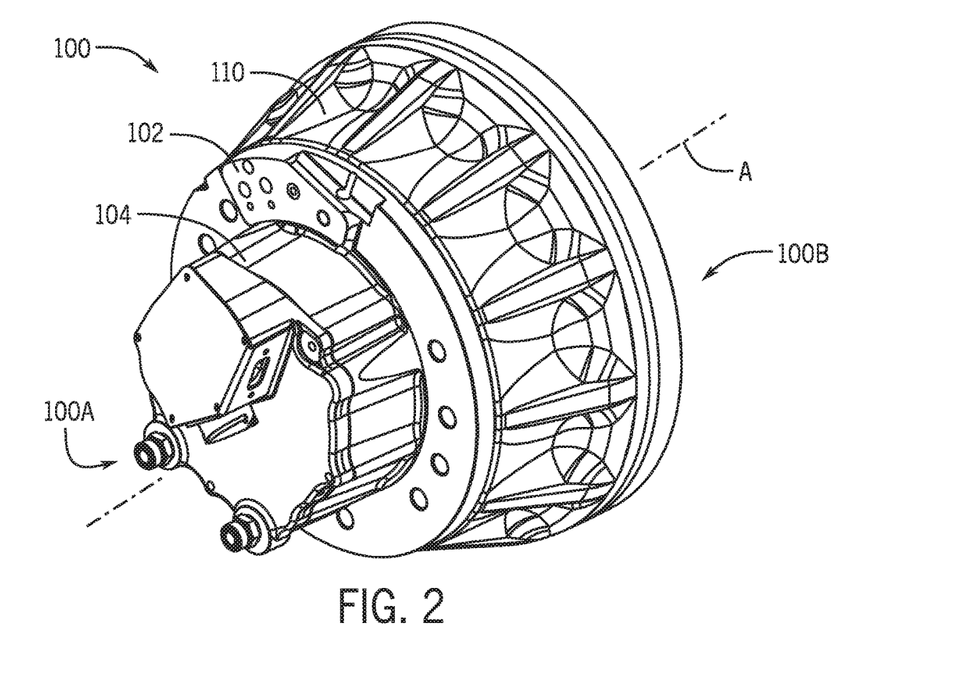
FIG. 2 is a perspective, exterior overview of an example drive assembly according to the present disclosure.
Figure 3:
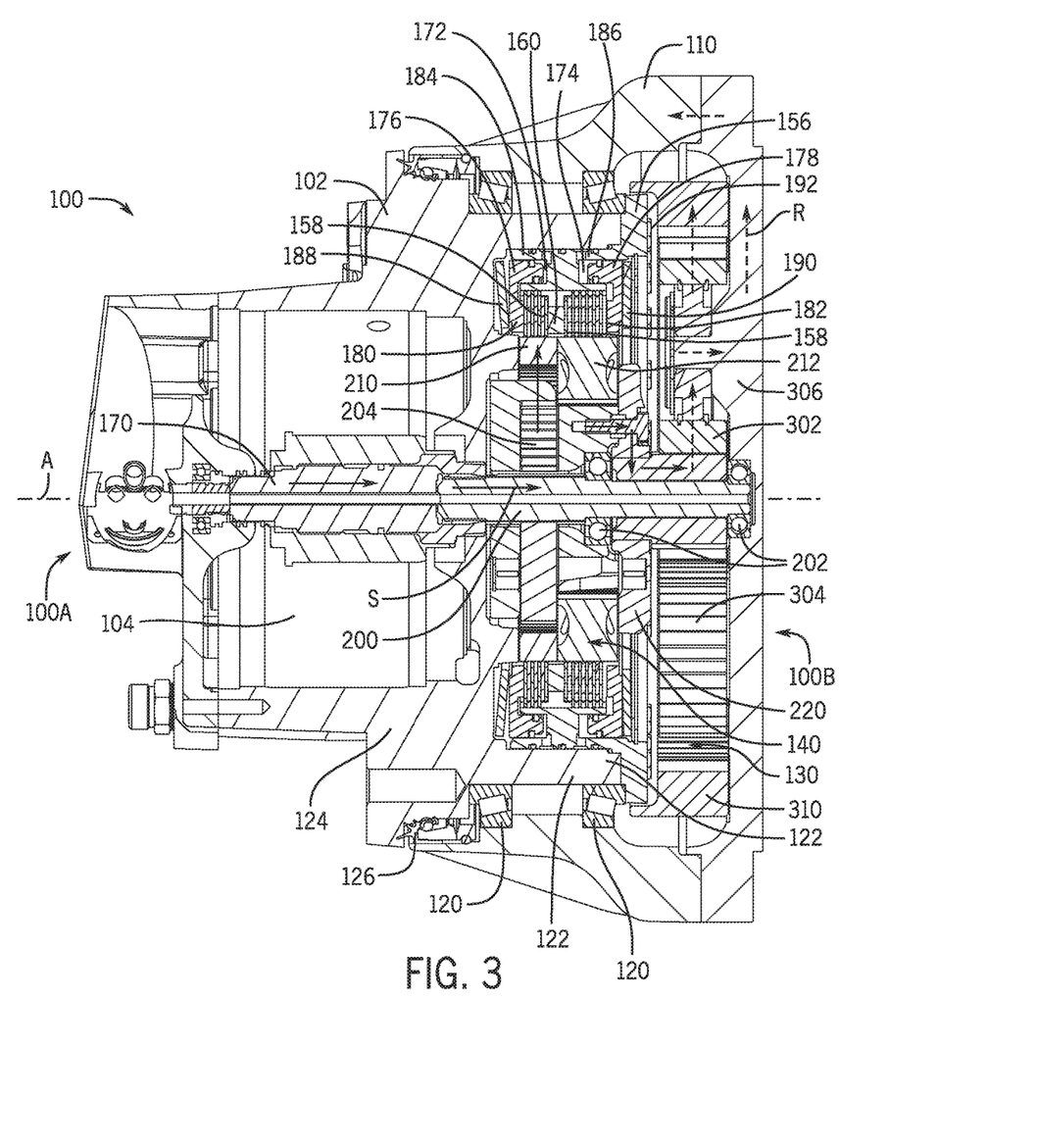
FIGS. 3-6 are side sectional views of the example drive assembly of FIG. 2 showing power flow in respective high, low, park and neutral modes of the drive assembly.

FIG. 2 illustrates the exterior of an example drive assembly 100 that may be used to turn the drive wheels 30 shown in FIG. 1. As the specific example drive assembly 100 is further detailed herein it will be appreciated that various components (or assemblies) may generally exhibit radial symmetry about an axis A, such that for these components the views depicted herein may represent a view of any number of diametric planes through the drive assembly 100. In FIG. 3, for example, the inboard direction corresponds to leftward, and the outboard direction corresponds to rightward.

As depicted, the drive assembly 100 generally includes a mounting assembly to facilitate attachment to the frame 22 of the motor grader 20. The mounting assembly may be included as a part of a larger drive housing 102 (or simply "housing") of the drive assembly 100, and is configured to remain relatively stationary during operation of the drive assembly 100, as will described in further detail below. A drive motor 104 may be attached to the drive housing 102 (e.g., via a motor mount) at an axial end 100A of the drive assembly 100, such that the drive motor 104 may be held in an appropriately stationary orientation for delivery of rotational power to the drive assembly 100. The drive motor 104 may be implemented as an electric motor (or other power source, such as a hydraulic motor) including a drive shaft (not shown in FIG. 2) extending towards another axial end 100B of the drive assembly 100. In other embodiments, alternate configurations are possible. The drive assembly 100 may be configured to directly engage the wheels 30 of the motor grader 20, or may mount an intermediate power transmission component. In any case, operation of the drive assembly may drive movement of the wheels 30, and thereby movement of the motor grader 20.

Referring now to FIGS. 3-7, the drive assembly 100 may include a wheel mount 110 that is arranged to rotate with respect to the drive housing 102 (and thereby the mounting frame 22 of the motor grader 20). The drive housing 102 is configured to be securely mounted to the frame 22 of the motor grader 20, while the wheel mount 110 is configured to be securely mounted to one of the drive wheels 30 of the motor grader 20. The drive assembly 100 includes a bearing assembly having two annular roller bearings 120, as shown. Inner diameters of the bearings 120 are mounted to (i.e., radially and axial supported by) a bearing support 122 that mounts to (e.g., bolts) or is a part of the drive housing 102, such as being formed at a distal end of a central housing hub 124. The outer diameters of the bearings 120 are mounted to the wheel mount 110. Face seals 126 may be mounted between opposing faces of the housing hub 124 and the wheel mount 110 to retain fluids (e.g., hydraulic fluid, lubricant, coolant and the like) and block external debris and contaminants. The drive motor 104 (e.g., an electric motor) mounts to the inboard (left in FIG. 3) axial end of the drive housing 102.

The example drive assembly 100 includes two planetary gear sets, including a (second stage) final gear reduction assembly having a reduction planetary set 130 and a (first stage) range shifting planetary set 140. The drive assembly 100, and specifically the range shifting assembly thereof, includes a brake arrangement with two brake components 152, 154 that are communicatively coupled to the shifting planetary set 140. Briefly, when the brake component 152 is engaged (or energized), and the brake component 154 is disengaged (or de-energized), the drive assembly 100 operates in a high speed mode H. When the brake component 154 is engaged, and the brake component 152 is disengaged, the drive assembly 100 operates in a low speed mode L. The drive assembly 100 operates in a neutral mode N when neither brake component 152, 154 is engaged and in a park mode P when both brake components 152, 154 are engaged. The modes of operation are described in detail below.

More specifically now, the drive assembly 100 includes an input shaft 170 driven by the drive motor 104 that drives a shifting planetary set 140 by direct coupling to a sun gear 200, which is supported for rotation with respect to the drive housing 102 by bearings 202. In the illustrated example, the input shaft 170 and the sun gear 200 have central axial passages therein that may be used for coolant or lubricant to flow through. However, these passages are not necessary for power flow of the drive assembly 100, and thus may be omitted. The sun gear 200 receives rotational input from the input shaft 170 continuously (except when the input shaft 170 is held stationary (e.g., via motor control logic)), and the shifting planetary set 140 transfers the rotational input from the input shaft 170 to one of two main power paths (e.g., H and L speeds) via the sun gear 200. In the illustrated example, the shifting planetary set 140 is a compound planetary set, the details of which will now be described.

Figure 7:
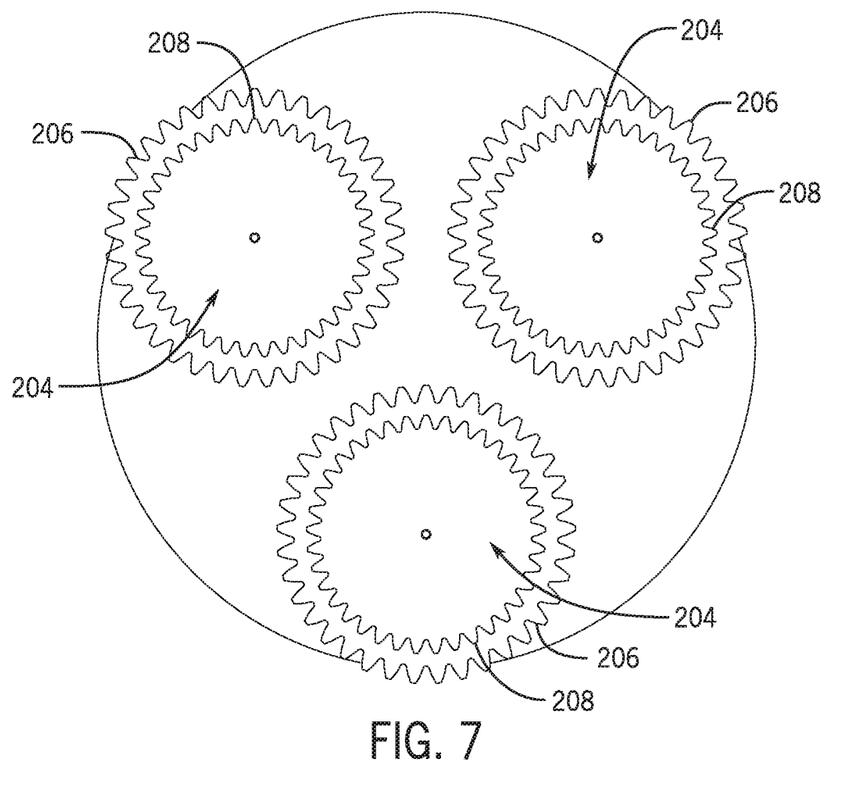
FIG. 7 is an end view showing an example arrangement of three double planet gears for an example compound planetary gear shift assembly of the drive assembly of FIG. 2.

A toothed section of the sun gear 200 meshes with teeth of a set of planet gears 204. In the illustrated compound planetary set, as shown in FIG. 7, there are three planet gears 204, each being a double planet gear with two toothed annuli 206, 208 fixed with respect to one another to co-rotate together. Each annulus 206, 208 has a different nominal diameter and tooth count so as to effect a different gear ratio than the other. In the illustrated example, each annulus 206 is of a greater diameter and tooth count than each annulus 208. In other configurations, there could be a greater or lesser number of plane gears, the annuli of the double planet gears could be configured to rotate with respect to one another, or there here could be two sets of single planet gears. Each annulus 206, 208 engages a corresponding ring gear 210, 212. Although variants are possible, in the illustrated example, each ring gear 210, 212 is configured to have a generally common outer diameter and a different inner diameter. The inner diameters of the ring gears 210, 212 are toothed and sized to mesh with the teeth of the associated annulus 206, 208 of the planet gears 204. The engagement of the different tooth counts of the ring gears 210, 212 and the associated annulus 206, 208 of the planet gears effects a different gear ratio for each of the two H and L power flow paths through the shifting planetary set 140, as will be further described below. Each of the ring gears 210, 212 will be rotated by the planet gears 204 only when in an unbraked state, otherwise it will be stationary and the planet gears 204 will simply orbit around the sun gear 200. The planet gears 204 are supported for rotation on pinions of a planet carrier 220, which is splined to a sun gear 302 of a second stage, reduction planetary set 130, as described below. The planet carrier 220 in the illustrated example has two parts that are fixed together so that the planet carrier 220 rotates as a single unit when the planet gears 204 orbit the sun gear 200. Other configurations of the planet carrier are possible for other double planet gear or multiple single planet gear arrangements.

Thus, in this example embodiment, the shifting planetary set 140 is a sun-in, carrier-out compound planetary set. The shifting planetary set 140 fits axially within the axial ends of, and radially within the central opening or inner diameter of, the bearing support 122 to aid in the axially compactness of the drive assembly 100. As mentioned, and as will be described more below, the shifting planetary set 140 provides different gear ratios for two output speeds H and L as well as for a neutral mode N and a park brake P mode.

The shifting planetary set 140 is acted upon by the brake components 152, 154 to effect a particular operational mode of the drive assembly 100. Engagement and disengagement of the brake components 152, 154 is effected by an actuator assembly 150, which provides a spring-applied, hydraulically-released action to the brake components 152, 154. The disclosed configuration and arrangement of the brake components 152, 154 and the actuator assembly 150 facilitate the axial compactness of the drive assembly 100, in that they are fit axially and radially within the bearing support 122. The actuator assembly 150 incorporates a relatively large diameter spring and annular piston arrangement, which provides for significant axial force to the brake components 152, 154 over a short axial distance. In addition to axial compactness, this improves the energization and life of the brake components 152, 154, and thereby the drive assembly 100 overall.

The brake components 152, 154 each include a set of interleaved friction disks and separator plates, either one being couple (e.g., via a spline connection) to either the drive housing 102 (or an intermediary component fixed thereto) or a corresponding one of the ring gears 210, 212. For example, in the illustrated example, the frictions disks are splined to a reaction component 156, which is bolted to the bearing support 122 and thereby fixed to the drive housing 102, and the separator plates are splined to the ring gears 210, 212, with the brake component 152 having three of each, and the brake component having five of each. An end or bearing plate 158 may also be fixed to an annular ring 160 of the reaction component 156 against which the innermost separator plates may act to provide a force resisting axial movement of the brake components 152, 154.

The reaction component 156 forms a pair of opposing (axially outwardly opening) annular piston chambers 172, 174 that are radially outside of the friction disks/separator plates of the associated brake components 152, 154, and that receive annular pistons 176, 178 of respective annular piston plates 180,182 arranged axially on each side of the friction disks/separator plates. The reaction component 156 has ports 184, 186 that open to the associated piston chambers 172, 174. Springs 188, 190 are arranged axially to the outside of, and bear against, the associated piston plate 180, 182. In the illustrated example, the springs 188, 190 are Belleville-type springs that fits within the central opening or recess of the bearing support 122 and are captured axially between the bearing support 122 and a snap ring 192 connected to the reaction component 156. As noted, the radially outward arrangement of the brake components 152, 154 and actuator assembly 150 of the shifting planetary set 140 aids in the axial compactness of the drive assembly 100. Various seals (e.g., O-rings, gaskets or the like) are mounted to the reaction component 156 and/or the pistons 176, 178 as needed to isolate pressure within the piston chambers 172, 174.

In operation, the actuator assembly 150 is configured so that the springs 188, 190 apply axial forces acting on the piston plates 180, 182 to bring the interleaved friction disks and separator plates into close frictional contact sufficient to engage the brake components 152, 154 and cause the ring gears 210, 212 to be slowed or fixed against rotation with respect to the bearing support 122. Introducing hydraulic fluid pressure into the piston chambers 172, 174 applies axial forces acting on the annular pistons 176, 178 and piston plates 180, 182 sufficient to overcome the spring forces and sufficiently separate the friction disks and separator plates to disengage the brake components 152, 154 to disconnect the ring gears 210, 212 from the bearing support 122 and allow them to be rotated.

Having described the example shifting planetary set 140 in detail, the modes of the drive assembly 100 will now be described with continued reference to FIGS. 3-6. The power flow paths for through the shifting planetary set 140 are shown generally by dashed arrows S.

With reference to FIG. 3, the high speed mode H of the drive assembly 100 is effected by the brake component 152 being engaged and the brake component 154 being disengaged. Specifically, hydraulic pressure is vented from the actuator piston chamber 172 so that the spring 188 biases the actuator piston plate 180 to move the brake component 152 into the engaged position. Hydraulic pressure is applied to the actuator piston chamber 174 to drive the actuator piston plate 182 to disengage the brake component 154. Thus, the ring gear 210 is held fixed by the brake component 152, while the ring gear 212 is free to rotate. As the drive motor 104 rotates the input shaft 170, the sun gear 200 turns the planet gears 204 so that the large annuli 206 mesh with the fixed ring gear 210. The small annuli 208 of the planet gears 204 mesh and co-rotate (i.e., are "locked") with the freewheeling ring gear 212 and thus do not transfer power or affect the gear ratio. The planet gears 204 orbit about the sun gear 200 and rotate the planet carrier 220 at a different (e.g., faster) speed (and lower torque) than the input shaft 170 rotates. Power flows from the planet carrier 220 to the second stage sun gear 302 of the reduction planetary set 130 to drive the wheels 30 at a relatively high speed and low torque.

Figure 4:
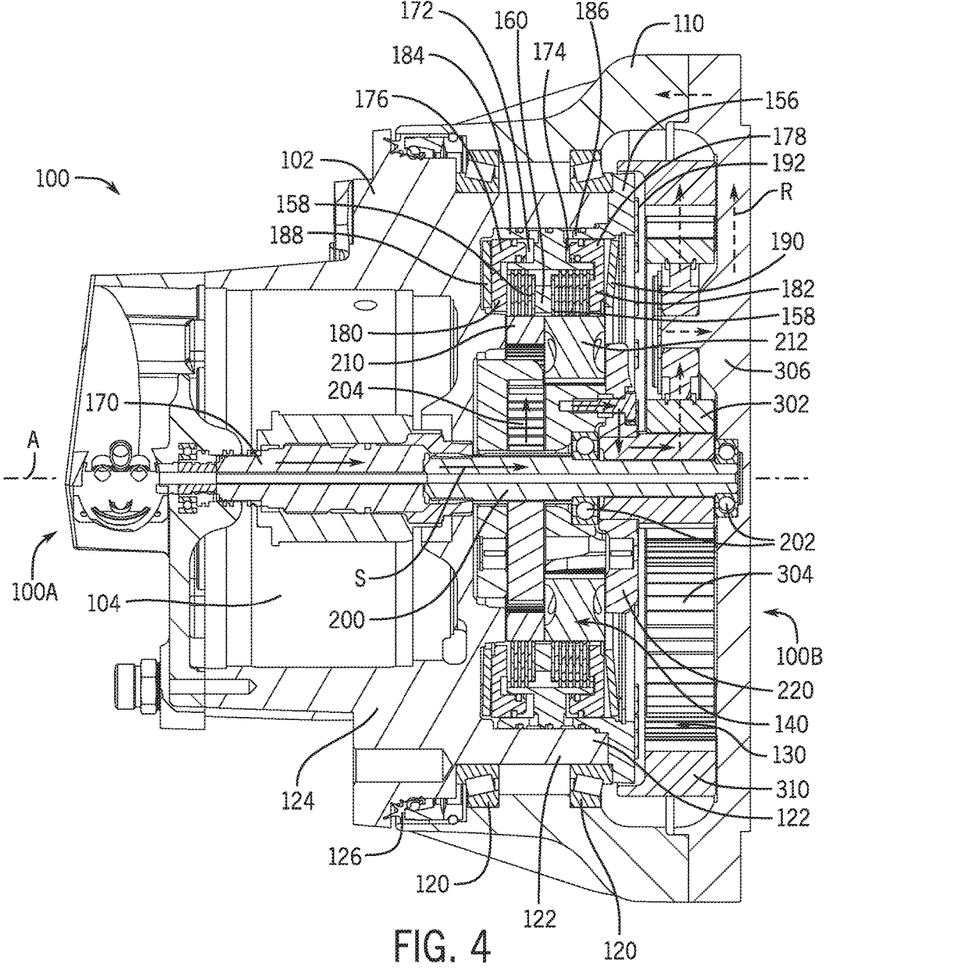

With reference to FIG. 4, the low speed mode L of the drive assembly 100 is effected by the brake component 152 being disengaged and the brake component 154 being engaged. Specifically, hydraulic pressure is vented from the actuator piston chamber 174 so that the spring 190 biases the actuator piston plate 182 to move the brake component 154 into the engaged position. Hydraulic pressure is applied to the actuator piston chamber 172 to drive the actuator piston plate 180 to disengage the brake component 152. Thus, the ring gear 212 is held fixed by the brake component 154, while the ring gear 210 is free to rotate. As the drive motor 104 rotates the input shaft 170, the sun gear 200 turns the planet gears 204 so that the small annuli 208 mesh with the fixed ring gear 212. The large annuli 206 of the planet gears 204 mesh and co-rotate (lock) with the freewheeling ring gear 210 and thus do not transfer power or affect the gear ratio. The planet gears 204 again orbit about the sun gear 200 and rotate the planet carrier 220 at a different speed and torque than the input shaft 170 (e.g., a lower speed and higher torque), and in particular a lower speed and higher torque than when the drive assembly 100 operates in the H mode). Again, power flows from the planet carrier 220 to the second stage sun gear 302 of the reduction planetary set 130 to drive the wheels 30 at a relatively low speed and high torque.

Figure 5:
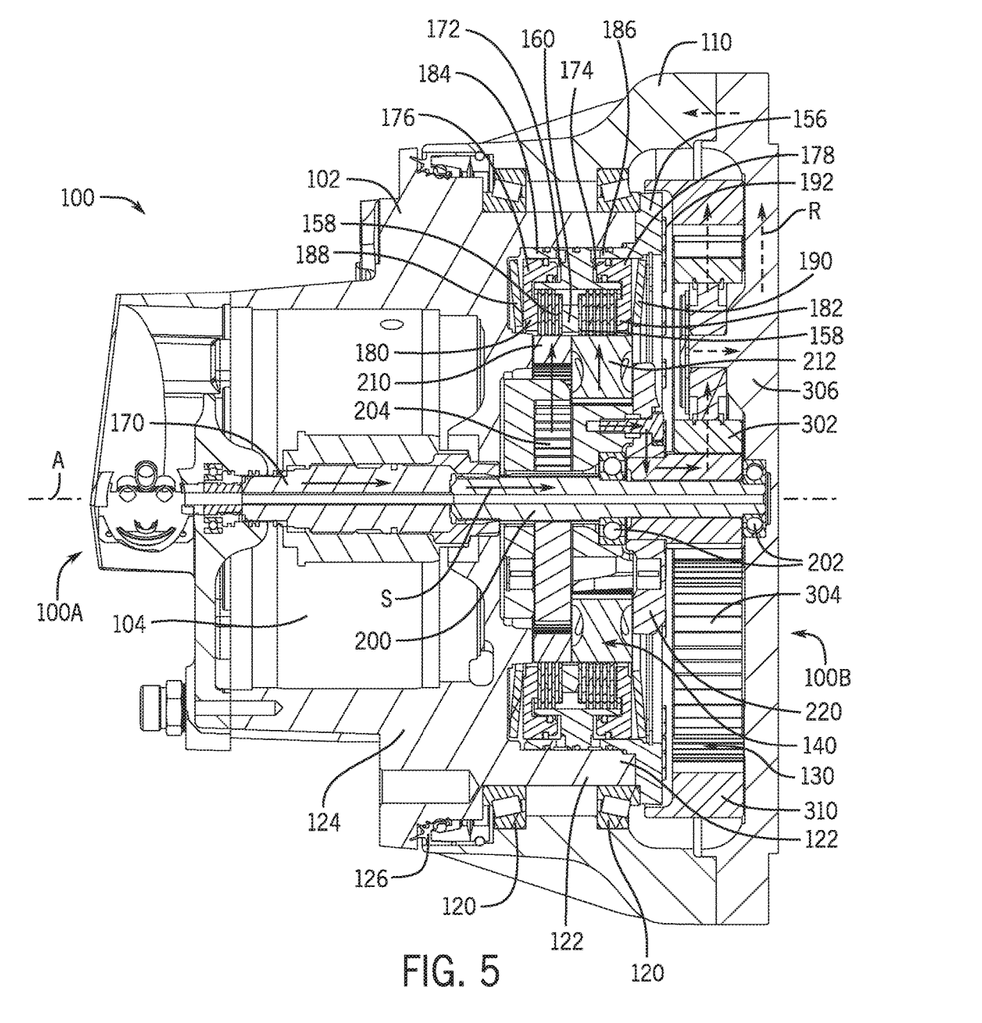

The park mode P and the neutral mode N of the drive assembly 100 are effected by the brake components 152, 154 being simultaneously engaged or disengaged, respectively. As shown in FIG. 5, in park mode P, with both brake components 152, 154 engaged, the input shaft 170 is held stationary by a fixed mechanical connection to the bearing support 122 via and the ring gears 210, 212, which brakes the drive assembly 100, and thereby the wheel mount 110.

Figure 6:
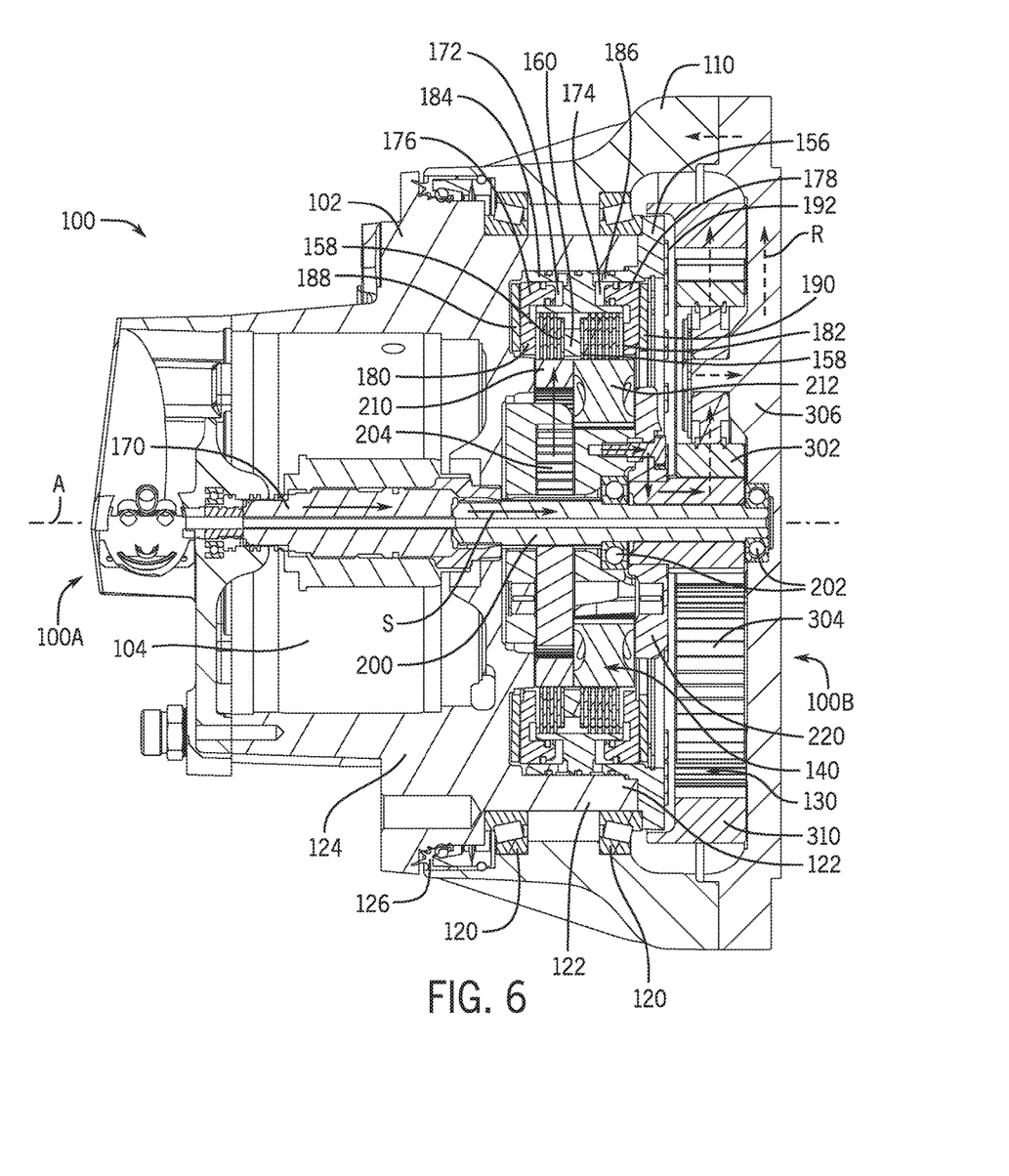

With reference to FIG. 6, in neutral mode N, disengagement of the brake components 152, 154 allows the ring gears 210, 212 to be rotated by the planet gears 204 as they are turned by the sun gear 200. As a result, the shifting planetary set 140 does not turn the planet carrier 220, and thus does not output power to the reduction planetary set 130. Rather, if the vehicle is moving, forces acting on the drive wheels 30 may tend to counter-rotate the reduction planetary set 130, and thereby the second stage sun gear 302, which in turn may counter-rotate the planet carrier 220 and other parts of the shifting planetary set 140. In order to prevent back-driving the drive motor 104, motor control logic maybe applied to hold the input shaft 104 stationary by issuing a zero speed motor command signal.

The power flow from the shifting planetary set 140 is delivered to the drive wheels 30 through the second stage reduction planetary set 130, and is the same in the L and H (and P) modes, shown generally by the solid arrows R beginning at the second stage sun gear 302. As shown, rotation of the first stage carrier 220 turns the integrally mounted (e.g., bolted or splined) second stage sun gear 302, to engage three second stage planet gears 304 (two shown in FIG. 3) of the reduction planetary set 130. The second stage planet gears 304 are mounted to pinion shafts of a second stage carrier 306, which is mounted (e.g., bolted) to the wheel mount 110. Rotation of the first stage carrier 220 turns the second stage sun gear 302, which engages the second stage planet gears 204 with respect to a second stage ring gear 310 that is fixed against rotation to the drive housing 102, which causes the second stage planet gears 304 to orbit, and thereby the second stage carrier 306 to rotate. This configuration causes power to flow from the second stage carrier 306 to the wheel mount 110, at the corresponding gear ratio. The wheel mount 110 mounts and drives the drive wheels 30.

The above describes example embodiments of a compact drive assembly that may provide deep gear reduction ratios and high torque. As non-limiting examples, the above-described constructions are suitable to provide a drive assembly with gear reduction ratios of about 50-150 and output torque of about 20,000-25,000 Nm. This functionality can be achieved in an assembly having a small form-factor, such as in which the wheel mount dimension is about 500-600 mm (e.g., 535 mm) in diameter and about 300-400 mm (e.g., 370 mm) in the axial dimension.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A drive assembly receiving rotational power from an input shaft rotatable about a rotation axis, the drive assembly comprising:
   a drive housing;
   a wheel mount rotatably mounted to the drive housing and configured to rotate about the rotation axis with respect to the drive housing; and
   a shift assembly within the drive housing coupled between the input shaft and the wheel mount to selectably cause rotation of the wheel mount at one of at least two different rotational speeds, the shift assembly including:
      a gear set having a first gear and a second gear, each of the first and second gears being rotatable by the input shaft independent of the other gear; and
      a brake arrangement having a first brake component and a second brake component;

wherein, during rotation of the wheel mount at a first rotational speed, the first brake component brakes the first gear of the gear set with respect to the drive housing;

wherein, during rotation of the wheel mount at a second rotational speed, the second brake component brakes the second gear of the gear set with respect to the drive housing; and wherein the shift assembly substantially fits radially within a central opening of the wheels bearing support and axially between axial ends of the wheel bearing support.

2. The drive assembly of claim 1, wherein, during rotation of the wheel mount at the first rotational speed, the second brake component is disengaged such that the second gear of the gear set rotates with respect to the drive housing; and wherein, during rotation of the wheel mount at the second rotational speed, the first brake component is disengaged such that the first gear of the gear set rotates with respect to the drive housing.

3. The drive assembly of claim 1, wherein, during a park mode of the drive assembly, the first brake component brakes the first gear of the gear set with respect to the drive housing, and the second brake component brakes the second gear of the gear set with respect to the drive housing.

4. The drive assembly of claim 1, wherein, during a neutral mode of the drive assembly, the first brake component is disengaged from the first gear of the gear set, and the second brake component is disengaged from the second gear of the gear set.

5. The drive assembly of claim 1, wherein each of the first brake component and the second brake component is an assembly of a plurality of friction disks interleaved with a plurality of separator plates.

6. The drive assembly of claim 1, wherein the first brake component is disposed radially between the first gear and the wheel mount; and wherein the second brake component is disposed radially between the second gear and the wheel mount.

7. The drive assembly of claim 6, wherein the drive housing defines a wheel bearing support supporting the wheel mount for rotation and configured such that the first brake component is radially between the first brake component and the wheel bearing support and the second brake component is radially between the second brake component and the wheel bearing support.

8. The drive assembly of claim 7, wherein the first brake component ties the first gear to the wheel bearing support during rotation of the wheel mount at the first rotational speed; and wherein the second brake component ties the second gear to the wheel bearing support during rotation of the wheel mount at the second rotational speed.

9. The drive assembly of claim 1, wherein the gear set is a compound planetary gear set; and wherein the first gear is a first ring and the second gear is a second ring gear.

10. The drive assembly of claim 9, wherein the planetary gear set includes a single set of planet gears mounted to a single carrier; and wherein each planetary gear defines a first gear ratio and a second gear ratio.

11. The drive assembly of claim 10, wherein each planet gear defines the first gear ratio by engagement of a first gear annulus with a sun gear and the first ring gear; and wherein each planet gear defines the second gear ratio by engagement of a second gear annulus with the sun gear and the second ring gear; and wherein the first gear annulus is of a different dimension than, and co-rotates with, the second gear annulus.

12. A shift assembly for a drive assembly, wherein the drive assembly receives rotational power from an input shaft rotatable about a rotation axis and includes a wheel mount mounted to a drive housing of the drive assembly and configured to rotate about the rotational axis with respect to the drive housing, the shift assembly comprising:

a gear set within the drive housing having a first gear and a second gear, each of the first and second gears being rotatable by the input shaft independent of the other gear; and a brake arrangement within the drive housing having a first brake component and a second brake component;

wherein, during rotation of the wheel mount at a first rotational speed, the first brake component brakes the first gear of the gear set with respect to the drive housing;

wherein, during rotation of the wheel mount at a second rotational speed, the second brake component brakes the second gear of the gear set with respect to the drive housing; and wherein the shift assembly substantially fits radially within a central opening of the wheels bearing support and axially between axial ends of the wheel bearing support.

13. The shift assembly of claim 12, wherein, during rotation of the wheel mount at the first rotational speed, the second brake component is disengaged such that the second gear of the gear set rotates with respect to the drive housing; and wherein, during rotation of the wheel mount at the second rotational speed, the first brake component is disengaged such that the first gear of the gear set rotates with respect to the drive housing.

14. The shift assembly of claim 12, wherein, during a park mode of the drive assembly, the first brake component brakes the first gear of the gear set with respect to the drive housing, and the second brake component brakes the second gear of the gear set with respect to the drive housing.

15. A shift assembly for a drive assembly, wherein the drive assembly receives rotational power from an input shaft rotatable about a rotation axis and includes a wheel mount configured to rotate about the rotational axis with respect to a housing of the drive assembly, the shift assembly comprising:

a gear set having a first gear and a second gear, each of the first and second gears being rotatable by the input shaft independent of the other gear; and a brake arrangement having a first brake component and a second brake component;

wherein, during rotation of the wheel mount at a first rotational speed, the first brake component brakes the first gear of the gear set with respect to the drive housing;

wherein, during rotation of the wheel mount at a second rotational speed, the second brake component brakes the second gear of the gear set with respect to the drive housing; and wherein, during a neutral mode of the drive assembly, the first brake component is disengaged from the first gear of the gear set, and the second brake component is disengaged from the second gear of the gear set.

16. The shift assembly of claim 12, wherein each of the first brake component and the second brake component is an assembly of a plurality of friction disks interleaved with a plurality of separator plates; and
  wherein the first brake component is disposed radially between the first gear and the wheel mount, and the second brake component is disposed radially between the second gear and the wheel mount.

17. The shift assembly of claim 12, wherein the gear set is a compound planetary gear set; and
  wherein the first gear is a first ring and the second gear is a second ring gear.

18. The shift assembly of claim 17, wherein the planetary gear set includes a single set of planet gears mounted to a single carrier; and
  wherein each planetary gear defines a first gear ratio by engagement of a first gear annulus with a sun gear and the first ring gear, and defines a second gear ratio by engagement of a second gear annulus with the sun gear and the second ring gear; and
  wherein the first gear annulus is of a different dimension than, and co-rotates with, the second gear annulus.

\* \* \* \* \*

UNITED STATES PATENT AND TRADEMARK OFFICE
CERTIFICATE OF CORRECTION

PATENT NO. : 10,207,580 B2
APPLICATION NO. : 15/373615
DATED : February 19, 2019
INVENTOR(S) : Long et al.

Page 1 of 1

It is certified that error appears in the above-identified patent and that said Letters Patent is hereby corrected as shown below:

On the Title Page

Item (74), under "Attorney, Agent, or Firm" delete "Klintworth & Rozenblatt" and insert -- Klintworth & Rozenblat --, therefor.

In the Claims

In Column 10, Line 54, in Claim 1, insert after "housing" -- defining a wheel bearing support --.

In Column 11, Line 10, in Claim 1, delete "wheels" and insert -- wheel --, therefor.

In Column 11, Lines 42-43, in Claim 7, delete "drive housing defines a".

In Column 11, Line 43, in Claim 7, delete "supporting" and insert -- supports --, therefor.

In Column 11, Line 44, in Claim 7, insert after "and" -- is --.

In Column 12, Line 28, in Claim 12, delete "the wheels" and insert -- a wheel --, therefor.

Signed and Sealed this
Seventh Day of May, 2019

Andrei Iancu
*Director of the United States Patent and Trademark Office*